(12) United States Patent
Boyer et al.

(10) Patent No.: US 8,291,884 B2
(45) Date of Patent: Oct. 23, 2012

(54) MULTI-ZONE GASEOUS FUEL HIGH EFFICIENCY ENGINE

(75) Inventors: Brad Alan Boyer, Canton, MI (US); Matthew Aaron Younkins, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/248,652

(22) Filed: Sep. 29, 2011

(65) Prior Publication Data

US 2012/0132174 A1 May 31, 2012

(51) Int. Cl.
*F02B 43/00* (2006.01)
(52) U.S. Cl. ......... 123/298; 123/305; 123/638; 123/527
(58) Field of Classification Search ........... 123/DIG. 12, 123/527, 298, 305, 638
See application file for complete search history.

(56) References Cited

U.S. PATENT DOCUMENTS

| | | | |
|---|---|---|---|
| 4,974,559 A * | 12/1990 | Nagaoka | 123/169 PA |
| 7,111,452 B2 * | 9/2006 | Miyoshi et al. | 60/285 |
| 7,117,830 B1 | 10/2006 | Boyer et al. | |
| 7,117,849 B1 | 10/2006 | Reatherford et al. | |
| 7,162,995 B2 * | 1/2007 | Munshi | 123/305 |
| 7,216,640 B2 * | 5/2007 | Song et al. | 123/698 |
| 7,367,312 B1 | 5/2008 | Boyer et al. | |
| 7,377,267 B2 | 5/2008 | Boyer et al. | |
| 7,487,750 B2 | 2/2009 | Leone et al. | |
| 7,608,011 B2 | 10/2009 | Grabowski et al. | |
| 7,793,620 B2 | 9/2010 | Kotwicki et al. | |
| 7,980,220 B2 | 7/2011 | Boyer et al. | |
| 7,992,542 B2 * | 8/2011 | Glugla et al. | 123/406.2 |
| 8,006,666 B2 * | 8/2011 | Ashida et al. | 123/275 |

\* cited by examiner

*Primary Examiner* — Erick Solis
(74) *Attorney, Agent, or Firm* — Julia Voutyras; Brooks Kushman P.C.

(57) ABSTRACT

An engine having cylinders capable of combusting gaseous fuel includes at least one spark plug per cylinder, a gaseous fuel injector extending into each cylinder and having at least one nozzle cluster containing a one or more nozzles positioned to direct gaseous fuel only toward a spark gap of an associated spark plug, and a control system operating each spark plug and each injector to deliver gaseous fuel directly to the cylinder and initiate combustion. A method for controlling an engine capable of operating with gaseous fuel includes injecting the gaseous fuel directly into each cylinder through a centrally located injector having a plurality of clusters of nozzles, each cluster associated with one of at least two spark plugs positioned closer to a cylinder wall than to the injector, each cluster directing the gaseous fuel toward an associated spark plug gap.

20 Claims, 7 Drawing Sheets

MULTI-ZONE GASEOUS FUEL HIGH EFFICIENCY ENGINE

TECHNICAL FIELD

The present disclosure relates to a multi-zone gaseous fuel internal combustion engine.

BACKGROUND

Various types of internal combustion engines for vehicles may burn gaseous fuels in place of, or in combination with, conventional liquid fuels like gasoline. Gaseous fuels may include hydrogen, natural gas, propane, and lighter flammable hydrocarbon derivatives, for example. Gaseous fuels may provide various advantages relative to conventional liquid fuel injection, such as reduction of nitrogen oxide emissions, particulate matter, and hydrocarbons, lower fuel cost, and/or the ability to utilize fuels other than fossil fuels to power the vehicle.

Gaseous fuels are generally stored on-board the vehicle in supercooled liquefied form or in one or more pressurized tanks, which present various challenges that are not encountered using conventional liquid fuels. Fuel cost and storage are both affected proportionately with fuel consumption. Even though standard hydrogen engines are among the most efficient automotive engines known, the disadvantage relative to fuel storage and cost remain barriers to widespread marketability. As such, fuel efficiency remains a primary concern for automotive OEMs attempting to introduce low-cost hydrogen and other gaseous fuel products. The present disclosure recognizes that fuel concentration and distribution should be carefully considered to balance the tradeoff between NOx emissions, heat transfer to the cylinder walls of the engine, and overall efficiency of the engine.

SUMMARY

An engine having cylinders capable of combusting gaseous fuel includes at least one spark plug per cylinder, a gaseous fuel injector extending into each cylinder and having at least one nozzle cluster containing one or more nozzles positioned to direct gaseous fuel only toward a spark gap of an associated spark plug, and a control system operating each spark plug and each injector to deliver gaseous fuel directly to the cylinder and initiate combustion.

A method for controlling an engine capable of operating with gaseous fuel includes injecting the gaseous fuel directly into each cylinder through a centrally located injector having a plurality of clusters of nozzles, each cluster associated with one of at least two spark plugs positioned closer to a cylinder wall than to the injector, each cluster directing the gaseous fuel toward an associated spark plug gap.

In one embodiment, an engine capable of combusting gaseous fuel includes an engine block having a plurality of cylinders and at least one cylinder head having a centrally located injector aperture, radially outboard spark plug apertures relative to the injector aperture, two intake valve openings, and two exhaust valve openings for each associated cylinder. The engine includes a first and second spark plug associated with each cylinder and having associated first and second spark gaps, respectively, and a gaseous fuel injector for each cylinder extending through an associated injector aperture into the cylinder, the injector including a first cluster of nozzles positioned to direct gaseous fuel to the first spark gap and a second cluster of nozzles positioned to direct gaseous fuel to the second spark gap. A controller in communication with the injectors and the spark plugs generates injection signals to inject gaseous fuel into respective cylinders with an end of injection timing and ignition timing signals to ignite the gaseous fuel in response to current engine operating conditions.

In one embodiment, end of injection (EOI) timing ranges between about 15 and 85 degrees before top dead center (BTDC). Various embodiments may include injectors having first and second clusters of nozzles each including three nozzles. Each cluster injects the major fraction (>85%) of fuel spanning a radial range of between about 5 and 78 degrees and an axial range of between about 17 and 62 degrees resulting in multiple semi-distinct zones for combustion associated with each spark plug in each cylinder. By control of the injection timing, the stratification can be controlled for direct ignition of the leading edge of the fuel mixture (later EOI's), or with substantial time delay between injection and ignition, allowing for additional space and time for mixing and useful for high efficiency with lower NOx emissions combinations (earlier EOI's).

Various embodiments according to the present disclosure provide associated advantages. For example, control of fuel concentration and distribution according to embodiments of the present disclosure balance tradeoffs between emissions, heat transfer to the cylinder walls, and overall efficiency of the engine. While strategies according to the present disclosure can be realized with a narrow range of design attributes, empirical evidence has demonstrated that the use of two spark plugs per cylinder in combination with an injector having corresponding nozzle clusters of three nozzles each to create multiple semi-distinct zones for combustion may increase brake thermal efficiency by up to 5% for a hydrogen fueled engine. While embodiments using a single spark plug and dual multi-nozzle clusters each having three nozzles improve overall efficiency, use of dual spark plugs provides better combustion stability and facilitates more flexible injection timing, which contributes to additional efficiency gains. In addition, various embodiments exhibit an improved burn rate of 10-90% with burn time decreased by 10-15 crank angle degrees throughout the engine operating range.

The above advantages and other advantages and features of embodiments associated with the present disclosure will be readily apparent from the following detailed description when taken in connection with the accompanying drawings.

DETAILED DESCRIPTION

Detailed embodiments of the present disclosure are illustrated and described herein; however, it is to be understood that the disclosed embodiments are merely exemplary and a system or method according to the present disclosure may be embodied in various and alternative forms other than those explicitly illustrated and/or described. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the present disclosure.

As those of ordinary skill in the art will understand, various features of the embodiments as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
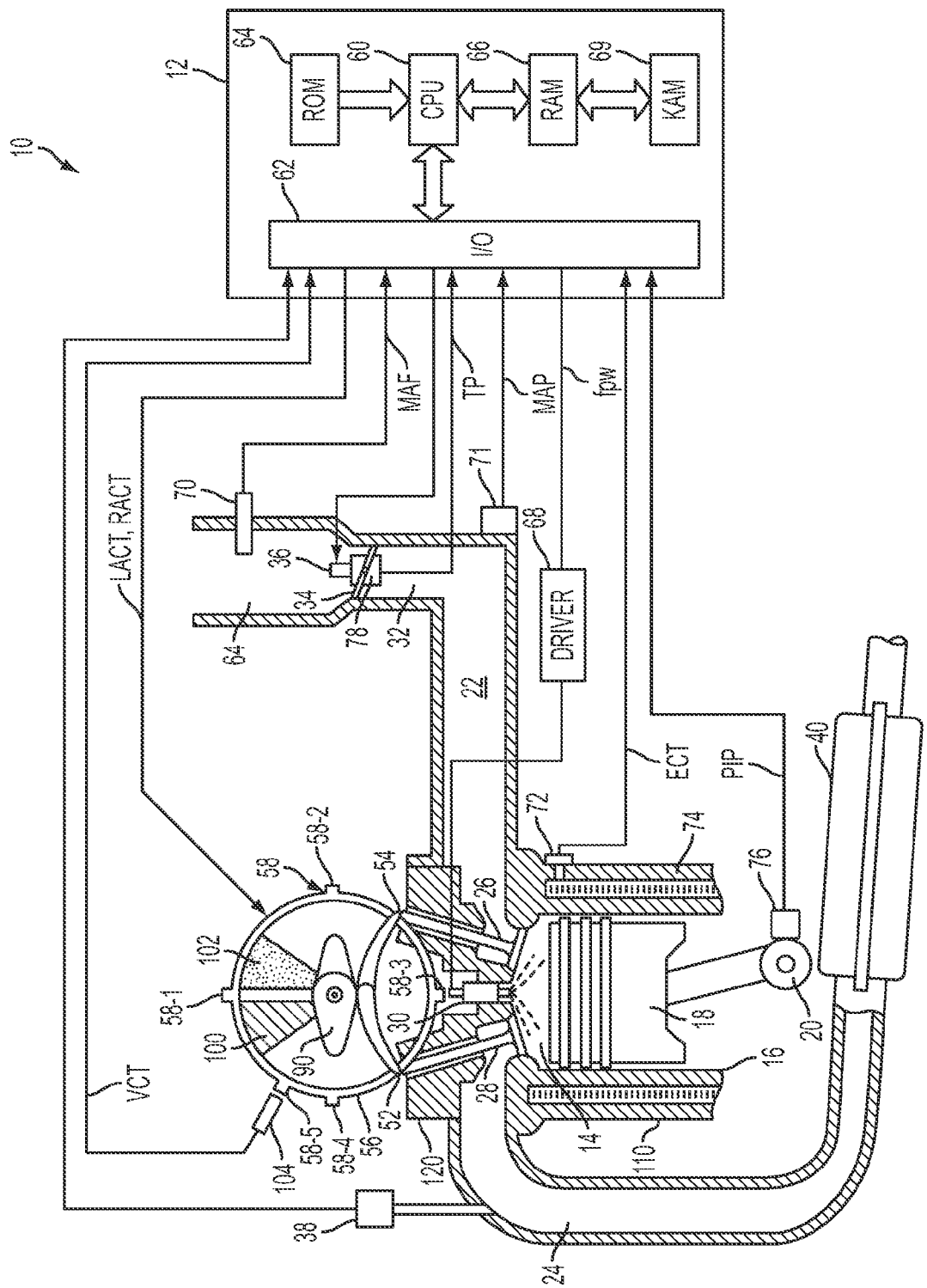
FIG. 1 is a block diagram illustrating operation of an engine capable of operating with a gaseous fuel according to embodiments of the present disclosure.

FIG. 1 shows, generally at 10, an exemplary embodiment of one cylinder within an engine block 110 of a multi-cylinder engine capable of operating with gaseous fuel with intake and exhaust paths connected to the cylinder, and an exemplary embodiment of a camshaft having a variable timing mechanism for controlling the valves of the cylinder. It will be appreciated that the configuration of engine 10 is merely exemplary, and that the systems and methods described herein may be implemented in any other suitable engine. Further, the engine may be spark ignited via at least one spark plug located in the cylinder (best shown in FIGS. 2 and 4), the timing of which may be varied with operating conditions as described in greater detail herein.

Continuing with FIG. 1, engine 10 is controlled by a control system including an electronic engine controller 12. Combustion chamber, or cylinder, 14 of engine 10 is shown including combustion chamber walls 16 with piston 18 positioned therein and connected to crankshaft 20. Combustion chamber 14 is shown communicating with intake manifold 22 and exhaust manifold 24 via selective openings of at least one intake valve 26 and at least one exhaust valve 28, respectively. Gaseous fuel injector 30 is coupled to combustion chamber 14 and generally centrally located within a corresponding aperture of cylinder head 120 for delivering injected fuel directly therein in proportion to the fuel pulse width (fpw) signal received from controller 12 via conventional electronic driver 68. Fuel is delivered to fuel injector 30 by a gaseous fuel system (not shown) that may include a fuel tank, one or more fuel pumps, and a fuel rail, for example. As described in greater detail with reference to FIG. 2, in one embodiment first and second spark plugs associated with each cylinder and having associated first and second spark gaps are positioned closer to the cylinder wall than to injector 30. Injector 30 includes a cluster of nozzles associated with each spark plug/gap and positioned with an empirically determined angle/distance to direct the fuel charge into a semi-distinct zone associated with each spark plug/gap for combustion.

Intake manifold 22 is shown communicating with throttle body 32 which contains throttle plate 34. In this particular example, throttle plate 34 is coupled to electric motor 36 so that the position of throttle plate 34 is controlled by controller 12 via electric motor 36. In an alternative embodiment (not shown), throttle body 32 and throttle plate 34 are omitted.

Exhaust gas sensor 38 is shown coupled to exhaust manifold 24 upstream of an aftertreatment device 40. Aftertreatment device 40 may include any suitable type of device for reducing emissions from engine 10. Examples include, but are not limited to, three-way and four-way catalytic converters, particulate filters, lean NOx trap, etc. As described in greater detail herein with reference to FIGS. 5 and 8, use of a gaseous fuel injector having nozzle clusters associated with semi-distinct combustion zones for each spark plug/gap in combination with fuel injection and ignition timing according to various embodiments of the present disclosure may result in lower NOx emissions across a majority of the operating range of the engine.

Controller 12 is shown in FIG. 1 as a conventional microcomputer, including microprocessor unit 60, input/output ports 62, an electronic storage medium for executable programs and calibration values (shown as read only memory chip 64 in this particular example), random access memory 66, keep alive memory 69, and a conventional data bus. Controller 12 is shown receiving various signals from sensors coupled to engine 10, in addition to those signals previously discussed, including measurement of inducted mass air flow (MAF) from mass air flow sensor 70 coupled to throttle body 32; engine coolant temperature (ECT) from temperature sensor 72 coupled to cooling sleeve 74; a profile ignition pickup signal (PIP) from Hall effect sensor 76 coupled to crankshaft 20; throttle position TP from throttle position sensor 78; and manifold absolute pressure (MAP) signal from sensor 71.

Engine 10 may be configured to have variable intake valve and exhaust valve timing capabilities. For example, engine 10 may include electromechanically actuated valves that are controlled by controller 12. Alternatively, as shown in the representative embodiment of FIG. 1, engine 10 may include a mechanism to mechanically vary the intake and/or exhaust valve timings, for example by adjusting the timing of a camshaft. In the depicted embodiment, camshaft 90 of engine 10 is shown communicating with rocker arms 52 and 54 for actuating intake valve 26 and exhaust valve 28. Camshaft 90 is directly coupled to housing 56. Housing 56 forms a toothed wheel having a plurality of teeth 58. Housing 56 is hydraulically coupled to an inner driving member (not shown), which is in turn directly linked to crankshaft 20 via a timing chain (not shown). Therefore, housing 56 and camshaft 90 rotate at a speed substantially equivalent to the inner driving member. The inner driving member rotates at a constant speed ratio to crankshaft 20. However, by manipulation of the hydraulic coupling as will be described later herein, the relative position of camshaft 90 to crankshaft 20 can be varied by control of hydraulic pressures in advance chamber 100 and retard chamber 102. For example, by allowing high pressure hydraulic fluid to enter advance chamber 100 while allowing fluid to escape from retard chamber 102, the relative relationship between camshaft 90 and crankshaft 20 is advanced. Thus, intake valve 26 and exhaust valve 28 open and close at a time earlier than normal relative to crankshaft 20. Similarly, by allowing high pressure hydraulic fluid to enter retard chamber 102 while allowing fluid to escape from advance chamber 100, the relative relationship between camshaft 90 and crankshaft 20 is retarded. Thus, intake valve 26 and exhaust valve 28 open and close at a time later than normal relative to crankshaft 40.

Teeth 58, being coupled to housing 56 and camshaft 90, allow for measurement of relative cam position via cam timing sensor 104 providing variable camshaft timing (VCT) signal to controller 12. In the depicted embodiment, four teeth (labeled 58-1, 58-2, 58-3 and 58-4) are provided for measurement of cam timing and are equally spaced (for example, 90 degrees apart from one another) while tooth 58-5 at a different spacing may be used for cylinder identification. In addition, controller 12 sends control signals to conventional solenoid valves (not shown) to control the flow of hydraulic fluid either into advance chamber 100, retard chamber 102, or neither.

It will be understood that FIG. 1 merely shows one cylinder of a multi-cylinder engine, and that each cylinder has its own set of intake/exhaust valves, spark plug(s), fuel injector, etc. It will further be understood that the depicted engine 10 is shown only for the purpose of an example, and that the systems and methods described herein may be implemented in or applied to any other suitable engine having any suitable components and/or arrangement of components operable with gaseous fuel such as hydrogen, compressed natural gas (CNG), propane, etc. For example, intake valve 26 and exhaust valve 28 may be electromechanically actuated, and camshaft 90 (and various associated parts) may be omitted. Likewise, separate camshafts may be used to control the opening of intake valves 26 and exhaust valves 28. Where each valve is operated by a separate camshaft, each camshaft may include a variable timing mechanism such as that shown for camshaft 90 in FIG. 1 to allow the exhaust valve timing to be varied independent of the intake valve timing, and vice versa, via a variable cam timing system.

In operation, air is inducted through intake 22 into cylinder 14 and mixed with gaseous fuel. Controller 12 operates injector 30 to inject the gaseous fuel directly into each cylinder 14 through centrally located injector 30, which includes a plurality of clusters of nozzles (best illustrated in FIGS. 3A-3C) with each cluster associated with one of at least two spark plugs (FIG. 2) positioned closer to cylinder wall 16 than to injector 30, and directing the gaseous fuel toward an associated spark plug gap within cylinder 14. Controller 12 uses associated control system sensors and actuators to operate each spark plug and each injector 30 to deliver the gaseous fuel directly to cylinder 14 and initiate combustion with fuel injection and ignition timing determined in response to current engine and ambient operating conditions. In one embodiment, controller 12 controls injector 30 across an entire operating range of the engine to inject the major fraction of gaseous fuel (>85%) consisting essentially of hydrogen to provide an end of injection (EOI) ranging only between about 15-85 degrees after top dead center (ATDC). Each cluster of nozzles injects the major fraction (>85%) of fuel spanning a radial range of between about 5 and 78 degrees and an axial range of between about 17 and 62 degrees resulting in multiple semi-distinct zones for combustion associated with each spark plug in each cylinder. By control of the injection timing, the stratification can be controlled for direct ignition of the leading edge of the fuel mixture (later EOI's), or with substantial time delay between injection and ignition, allowing for additional space and time for mixing and useful for high efficiency with lower NOx emissions combinations (earlier EOI's).

Multi-cylinder engines capable of operating with gaseous fuel according to various embodiments of the present disclosure may be implemented by a naturally aspirated engine as shown, or may include various types of boost. For example, engine 10 may include an exhaust gas turbocharger, supercharger, or similar device. Various types of turbochargers or superchargers may be used alone or in combination. For example, a variable geometry turbocharger (VGT) may be used where the geometry of the turbine and/or compressor may be varied during engine operation. Alternately, or in addition, a variable nozzle turbocharger (VNT) may be used with a variable nazzle placed upstream and/or downstream of the turbine in the exhaust to vary the effective expansion of gasses through the turbine. Similarly, a twin turbocharger arrangement, and/or a sequential turbocharger arrangement may be used in some applications and implementations. As those of ordinary skill in the art will understand, the system and method for controlling gaseous fuel injection and ignition according to embodiments of the present disclosure is generally independent of the particular type of intake system and may be adapted for use in a variety of different engine technologies.

Figure 2:
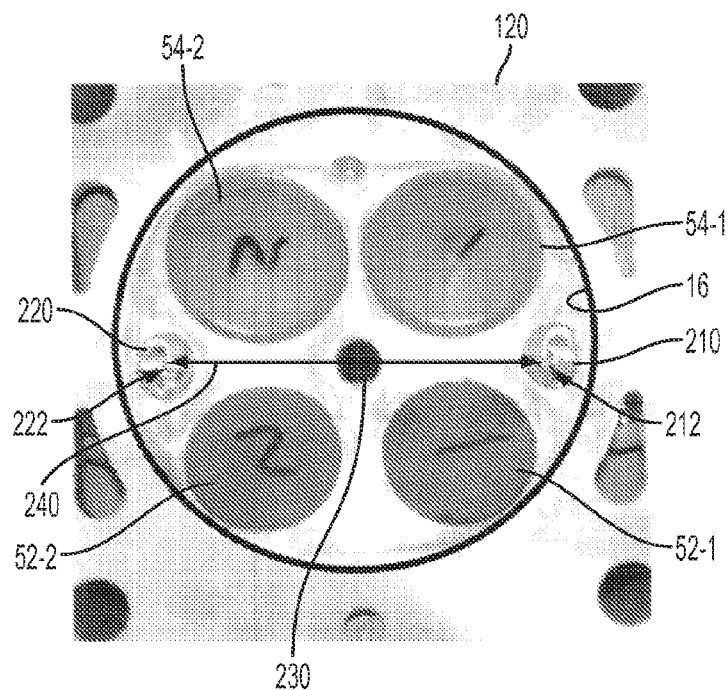
FIG. 2 is a bottom view of a cylinder head illustrating injector and spark plug positioning for a four valve-per-cylinder, dual spark plug embodiment of an engine capable of operating with a gaseous fuel according to various embodiments of the present disclosure.

Referring now to FIG. 2, a bottom view of a cylinder head illustrating injector and spark plug positioning for a four valve-per-cylinder, dual spark plug embodiment of an engine capable of operating with a gaseous fuel according to various embodiments of the present disclosure is shown. Cylinder head 120 includes an intake port and an exhaust port for each cylinder in communication with openings for first and second intake valves 54-1 and 54-2 and first and second exhaust valves 52-1 and 52-2, respectively. A first spark plug 210 includes a first spark gap 212 and a second spark plug 220 includes a second spark gap 222. Spark plugs 210, 220 extend through corresponding apertures within cylinder head 120 into combustion chamber or cylinder 14 and are positioned generally proximate or adjacent to cylinder wall 16. For example, in one embodiment, cylinder bores defined by cylinder wall 16 have a diameter of about 89 mm with spark plug electrodes for spark plugs 210, 220 separated by 71 mm. In another embodiment, spark plugs 210, 220 are positioned nearer injector 30, but closer to cylinder wall 16 than to injector aperture 230 (and an associated injector when installed). In one embodiment, spark plugs 210, 220 are aligned along a common cylinder transverse axis 240 with a centrally located injector aperture 230. As illustrated, transverse or radial cylinder axis 240 extends between intake valves 54-1, 54-2 (and associated intake valve openings) and exhaust valves 52-1 and 52-2 (and associated exhaust valve openings). As such, spark plugs 210, 220 are positioned in cylinder head 120 between the intake and exhaust ports associated with intake valves 54-1, 54-2 and 52-1, 52-2, respectively, adjacent cylinder wall 16.

Figure 3A:
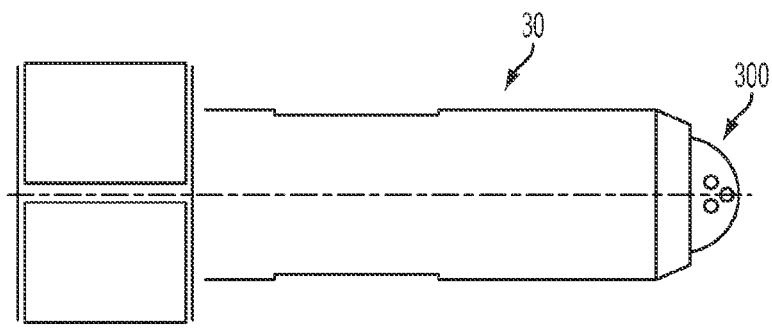
FIGS. 3A-3C illustrate a gaseous fuel injector having two clusters of nozzles for a gaseous fuel engine according to various embodiments of the present disclosure.
Figure 3B:
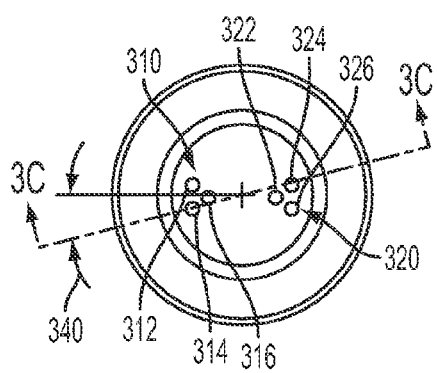
Figure 3C:
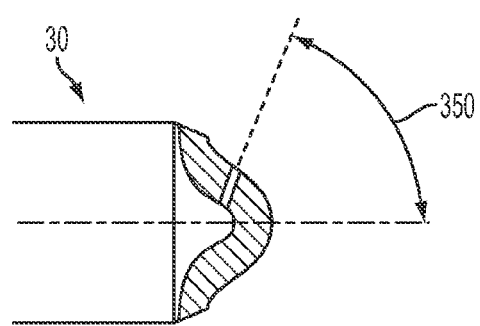

FIGS. 3A-3C illustrate a gaseous fuel injector according to various embodiments of the present disclosure. In contrast to various conventional or traditional injectors that have nozzle patterns with nozzles generally evenly spaced round the circumference of the nozzle tip and symmetrically positioned about the injector axis, a gaseous fuel injector according to various embodiments of the present disclosure includes clusters of nozzles, with each cluster arranged to direct gaseous fuel toward only a corresponding spark gap. FIG. 3A is a side view of injector 30, FIG. 3B is an end view of injector 30, and FIG. 3C is a partial cross-section of injector tip 300 from FIG. 3B. As shown in FIGS. 3A-3C, injector 30 includes at least one nozzle associated with a corresponding spark plug/gap when installed within injector aperture 230 (FIG. 2). In the embodiment illustrated, injector tip 300 includes a first cluster of nozzles 310 that includes three nozzles, 312, 314, and 316, and a second cluster of nozzles 320 that includes three nozzles 322, 324, and 326. First cluster of nozzles 310 directs gaseous fuel only toward a first spark plug/gap 210/212 (FIG. 2) and second cluster of nozzles 320 directs gaseous fuel only toward a second spark plug/gap 220/222 to form semi-distinct zones for combustion as illustrated and described in greater detail with respect to FIGS. 4A-4F.

In one embodiment, nozzle clusters 310, 320 each include three (3) nozzles positioned based on computer modeling and empirical data to provide a desired fuel spray for the design of directed-charge fuel injector 30. Cluster 310 includes a central nozzle 316 separated from each adjacent nozzle 312, 314 by a radial angle 340 of about 14 degrees to provide a fuel jet directed to a corresponding spark plug/gap that spans about 28 radial degrees relative to the injector central axis. Similarly, cluster 320 includes a central nozzle 322 separated from adjacent nozzles 324, 326 by a radial angle of about 14 degrees to provide a fuel jet directed to a corresponding spark plug/gap that spans about 28 radial degrees relative to the injector central axis. As such, in this embodiment, cluster 310 is separated from cluster 320 by about 150 radial degrees to generate multiple semi-distinct zones associated with each spark plug for combustion. Stated differently, any nozzle of cluster 310 is separated by at least 150 radial degrees from any nozzle of cluster 320, i.e. nozzles 326 and 312, or 324 and 314, are separated by about 150 radial degrees. As illustrated in FIG. 3B, the center or central nozzle 316, 322 of each cluster is separated by about 180 radial degrees. Stated differently, in embodiments where the fuel injector and two spark plugs are located along a common line or transverse cylinder axis, cluster 310 is diametrically opposed from cluster 320 with no clusters or nozzles between the first and second clusters 310, 320. Of course, the radial span or angle of the directed-charge may vary depending on the particular application and implementation. Empirical and computer modeling data for one prototype suggests a span of between about 5 and about 78 degrees provides an acceptable balance between fuel consumption and NOx emissions for an engine fuel consistent essentially of hydrogen.

The partial cross-section of injector tip 300 in FIG. 3C illustrates positioning of nozzles 312, 314, 316 and 322, 324, 326 relative to an injector axis, or relative to a top of the cylinder. In one embodiment, nozzles 312, 314, 234, and 326 form an axial angle 350 of about 70 degrees, while nozzles 322 and 316 form an axial angle (not specifically illustrated) of about 45 degrees. Of course, the complementary angle can be measured from the cylinder roof or top of the cylinder. Similar to the radial span, the axial span may vary depending on the particular application and implementation. However, empirical and computer modeling data for one prototype suggest a span of between about 17 degrees and about 62 degrees relative to the top of the cylinder (or between about 28 degrees and about 73 degrees relative to the injector axis) provides an acceptable balance between fuel consumption and NOx emissions for an engine fuel consisting essentially of hydrogen.

Figure 4E:
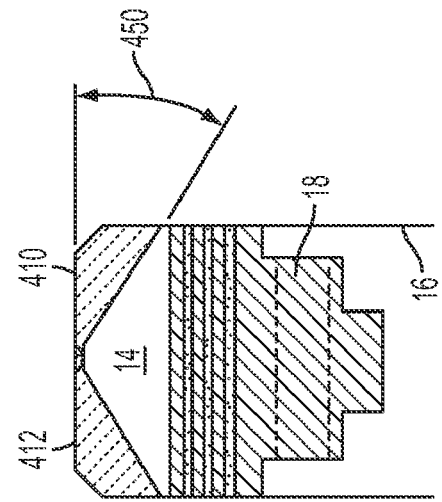
FIGS. 4A-4F illustrate gaseous fuel distribution into semi-distinct zones for combustion created by an injector having nozzles arranged according to various embodiments of the present disclosure.
Figure 4F:
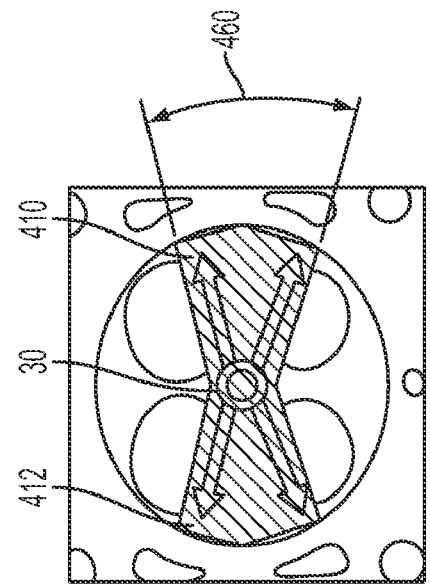
Figure 4C:
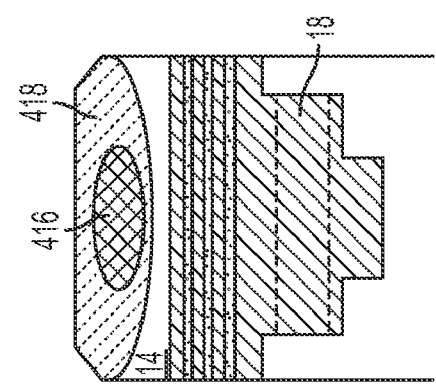
Figure 4D:
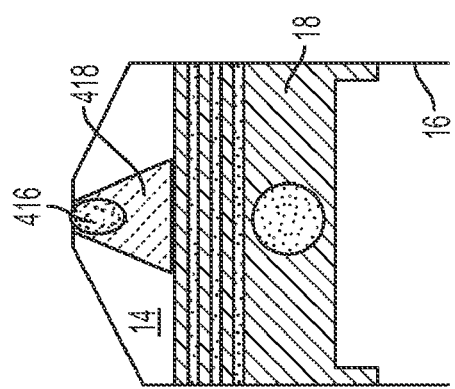
Figure 4A:
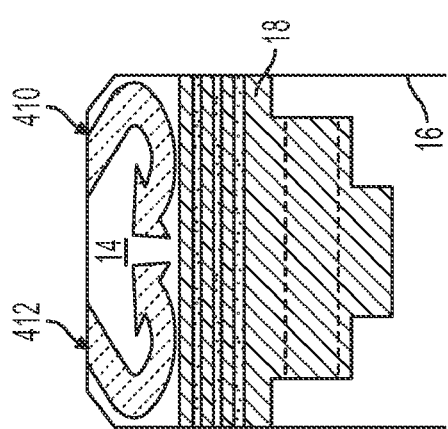
Figure 4B:
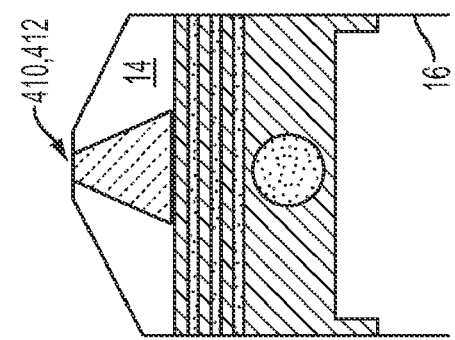

FIGS. 4A-4F illustrate expected or predicted gaseous fuel distribution into semi-distinct zones for combustion created by an injector having nozzles arranged according to various embodiments of the present disclosure. FIGS. 4A and 4C provide piston side views during first and second time periods, respectively, of the combustion cycle around top dead center as piston 18 moves up during the compression stroke and begins moving down during the power stroke. FIGS. 4B and 4D provide corresponding piston front views for the first and second time periods. The first time period represented by FIGS. 4A and 4B corresponds to the anticipated fuel location during and immediately following fuel injection, whereas the second time period represented by FIGS. 4C and 4D corresponds to the anticipated fuel location during ignition. As illustrated in FIG. 4A, gaseous fuel passing through first and second nozzle clusters is targeted toward the spark gaps and cylinder wall 16 forming jets 410, and 412. Cylinder wall 16 guides the fuel jets 410, 412 to piston 18, which reflects fuel into the center of chamber 14. The side view of FIG. 4B illustrates the relatively narrow fuel jets formed by each cluster of nozzles with each cluster directing fuel only toward a corresponding spark gap proximate to cylinder wall 16.

FIGS. 4C and 4D illustrate that the fuel is well mixed within a high combustion zone 416 and low combustion zone 418 just prior to and during ignition. Low combustion zone 418 acts as an insulating layer to reduce heat transfer to cylinder wall 16 and improve overall efficiency while reducing formation of NOx. Spark plugs may be positioned within cylinder 14 such that the spark gaps are in the low combustion zone just outside the high combustion zone to better manage burn rate and associated formation of NOx as illustrated and described in greater detail with reference to FIG. 7.

FIG. 4E provides a piston side view and FIG. 4F provides a bottom (in-cylinder) view of the gaseous fuel flow directional target for optimized combustion. As illustrated in FIG. 4E, first and second nozzle clusters produce corresponding jets 410 and 412 spanning an angle 450 of between about 17 degrees and about 62 degrees relative to the top of cylinder 14. As illustrated in FIG. 4F, injector 30 includes first and second nozzle clusters to generate corresponding first and second fuel jets 410, 412 that span a radial angle 460 of between about 5 degrees and about 78 degrees for each cluster.

Figure 5:
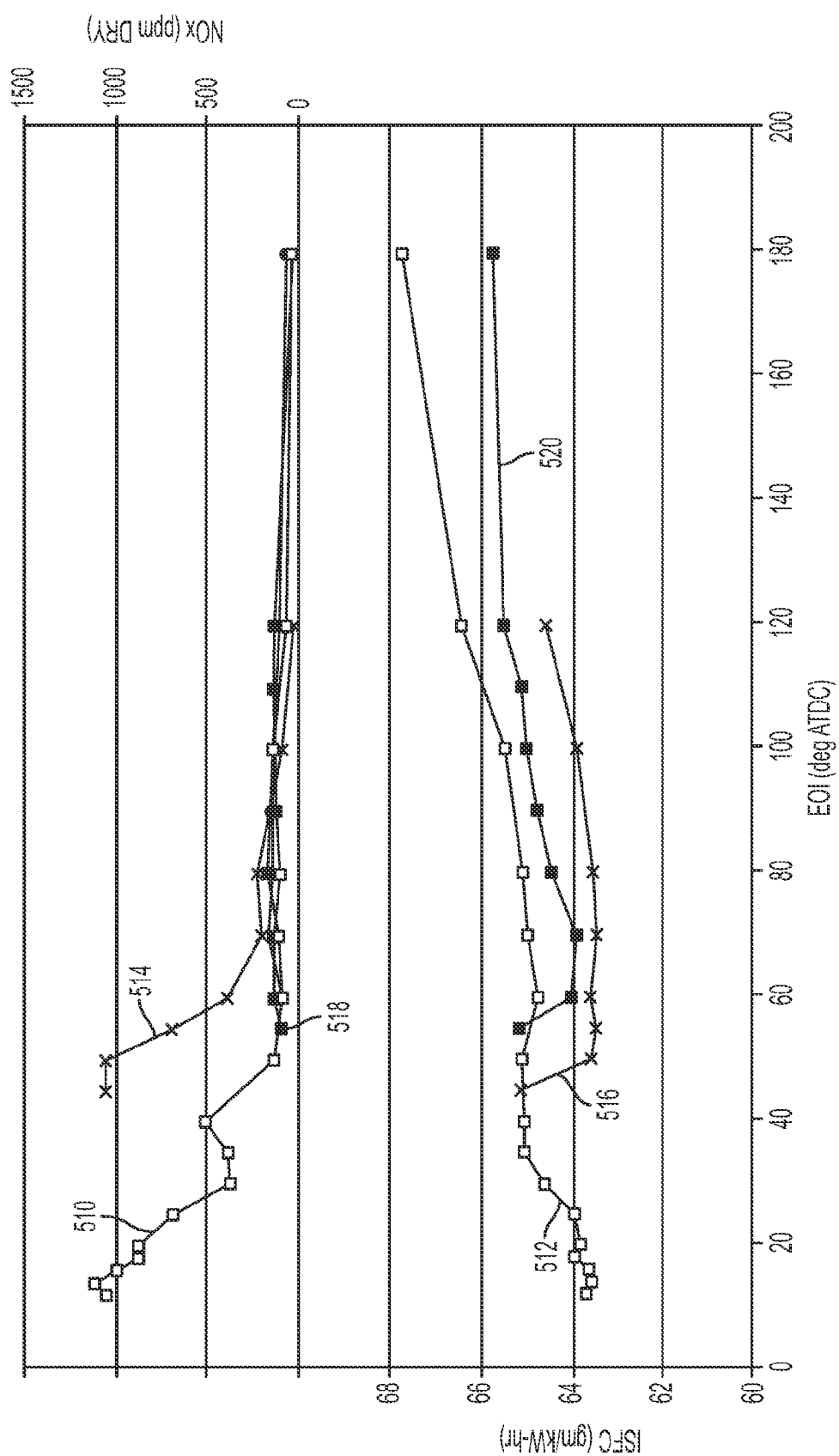
FIG. 5 illustrates reduction in fuel consumption and NOx generation for a single spark plug per cylinder embodiment of a gaseous fuel engine according to various embodiments of the present disclosure.

FIG. 5 illustrates reduction in fuel consumption and NOx generation for a single spark plug per cylinder embodiment of a gaseous fuel engine according to various embodiments of the present disclosure. The data of FIG. 5 were generated for an engine capable of operating with gaseous fuel using fuel consisting essentially of hydrogen. The plot illustrates fuel consumption and NOx as a function of injection timing at an engine speed of 3000 rpm and an equivalence ratio (phi) of 0.4. The data of FIG. 5 compare performance of a directional injector having two nozzle clusters of three nozzles each and a single plug per cylinder to a traditional injector design having 5 nozzles generally equally spaced around the circumference of the injector in both single plug per cylinder and dual plug per cylinder implementations. Lines 510 and 512 represent NOx and instantaneous specific fuel consumption (ISFC), respectively, for a 5-nozzle injector, dual plug per cylinder implementation. Lines 514 and 516 represent NOx and ISFC, respectively, for a directional injector (2 clusters with 3 nozzles each), single plug per cylinder implementation. Lines 518, 520 represent NOx and ISFC, respectively, for a 5-nozzle injector, single plug per cylinder implementation. As illustrated in FIG. 5, the directional injector (lines 514, 516) with a single plug per cylinder is superior to traditional injector designs with either a single plug per cylinder or a dual plug per cylinder configuration.

Figure 6:
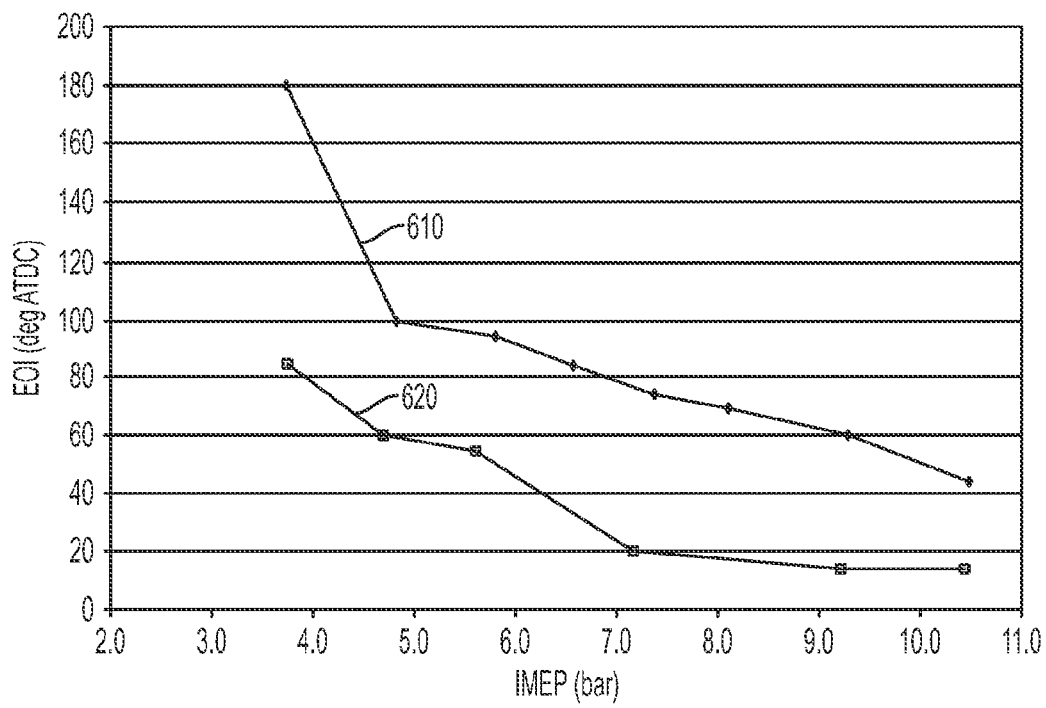
FIGS. 6 and 7 compare combustion efficiency and stability for single plug per cylinder and dual plug per cylinder implementations of a gaseous fuel engine according to various embodiments of the present disclosure.
Figure 7:
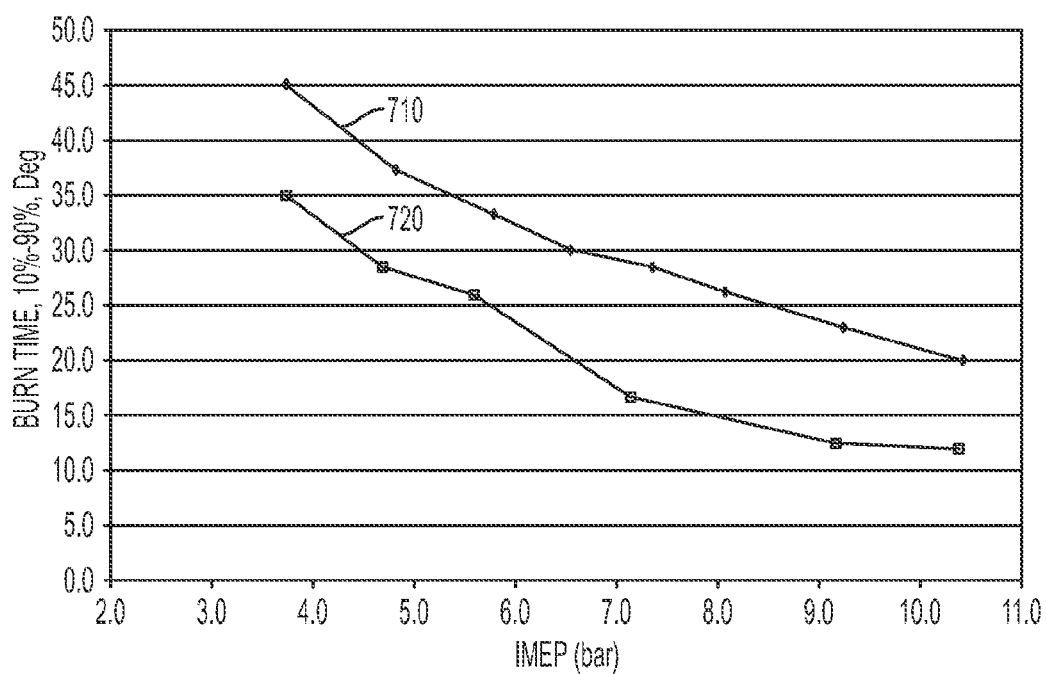

FIGS. 6 and 7 compare combustion efficiency and stability for single plug per cylinder and dual plug per cylinder implementations of a gaseous fuel engine according to various embodiments of the present disclosure. FIG. 6 illustrates end of injection (EOI) as a function of instantaneous manifold effective pressure (IMEP) for a single plug per cylinder implementation as represented by line 610 compared to a dual plug per cylinder implementation as represented by line 620. FIG. 7 illustrates burn time (or rate) as a function of IMEP for a single plug per cylinder implementation as represented by line 710 and a dual plug per cylinder implementation as represented by block 710.

As generally illustrated in FIGS. 6 and 7, injection timing is much more flexible in the dual plug per cylinder implementation represented by line 620 with the combustion stability range increased by 20-30 crank degrees, which facilitates more efficient injection timing. Similarly, burn rate improves 10-90% with the burn time decreased by 10-15 crank degrees throughout the operating range.

Figure 8:
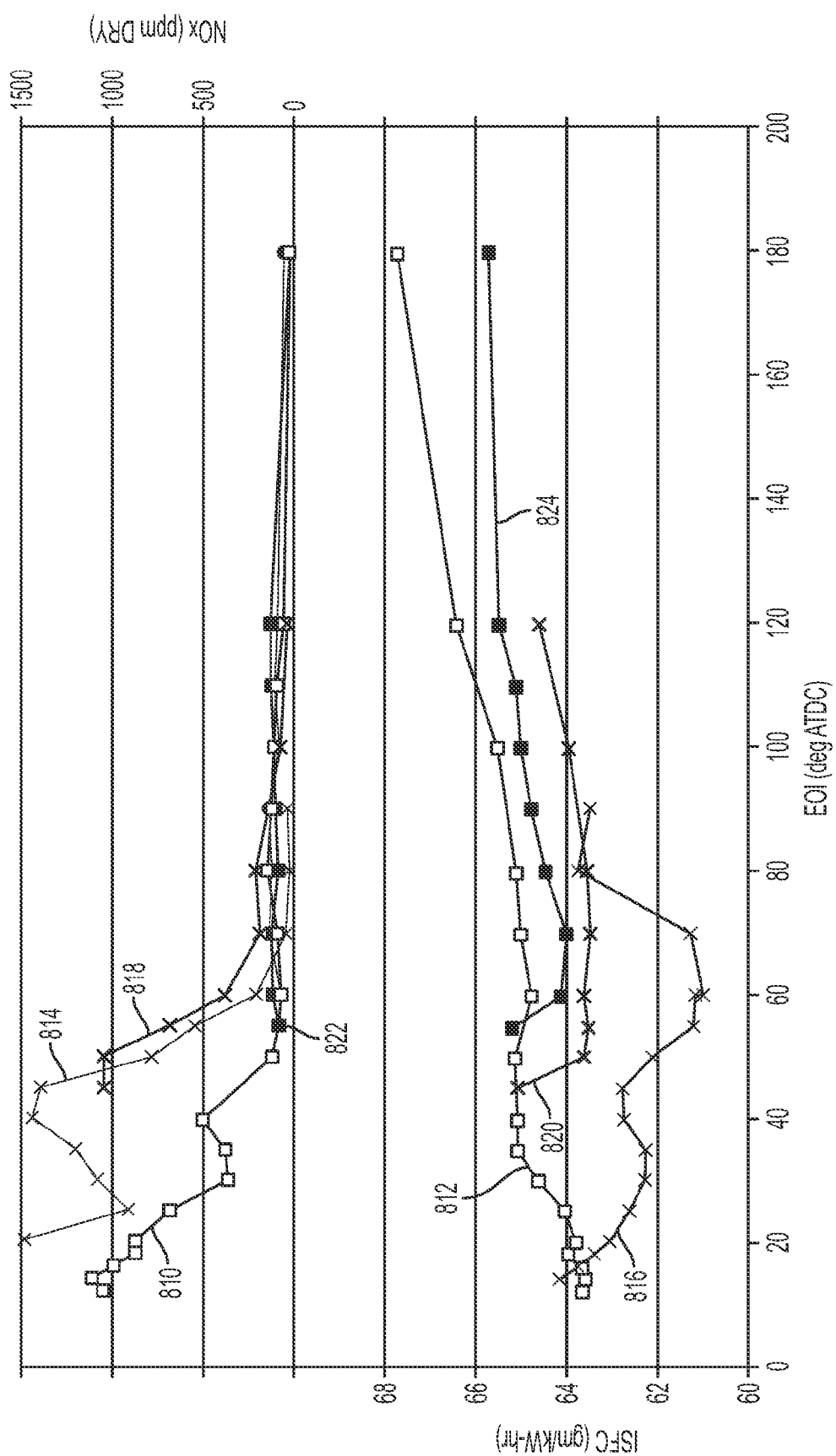
FIG. 8 illustrates reduction in fuel consumption and NOx generation for a dual spark plug per cylinder embodiment of a gaseous fuel engine according to various embodiments of the present disclosure.

FIG. 8 illustrates reduction in fuel consumption and NOx generation for a dual spark plug per cylinder and directional injector embodiment of a gaseous fuel engine according to various embodiments of the present disclosure. The representative data of FIG. 8 compare fuel consumption and NOx generation for traditional 5-nozzle injectors having nozzles generally equally spaced around the injector circumference with a directional injector having two clusters of three nozzles each, with the clusters separated by about 150 radial degrees for single plug per cylinder and dual plug per cylinder implementations. FIG. 8 provides an injection timing sweep illustrating fuel consumption (ISFC) and NOx generation as a function of end of injection (EOI) measured in crank degrees after top dead center (ATDC) at an engine speed of 3000 rpm and equivalence ratio (phi) of 0.4. Lines 810 and 812 represent NOx generation and fuel consumption, respectively, for a 5-nozzle dual plug implementation. Lines 814 and 816 represent NOx generation and fuel consumption, respectively, for a directional injector and dual plug per cylinder implementation according to embodiments of the present disclosure. Lines 818 and 820 represent NOx generation and fuel consumption, respectively, for a directional injector and single plug per cylinder implementation. Lines 822 and 822 represent NOx generation and fuel consumption, respectively, for a 5-nozzle injector, single plug per cylinder implementation.

As illustrated in FIG. 8, the synergy of a direction injector having nozzle clusters to direct the gaseous fuel toward corresponding spark gaps in a dual plug per cylinder implementation as represented by lines 814 and 816 improve (reduce) fuel consumption and generation of NOx particularly for injection timing of between about 55 degrees ATDC to about 70 degrees ATDC. When projected to full-system operation, this combustion system results in a very efficient automotive engine with projected brake thermal efficiency (BTE) of up to 48%, which is a 5% improvement over current systems under development. Of course, the actual obtainable BTE may vary depending on a wide variety of engine, vehicle, and ambient operating conditions.

Figure 9:
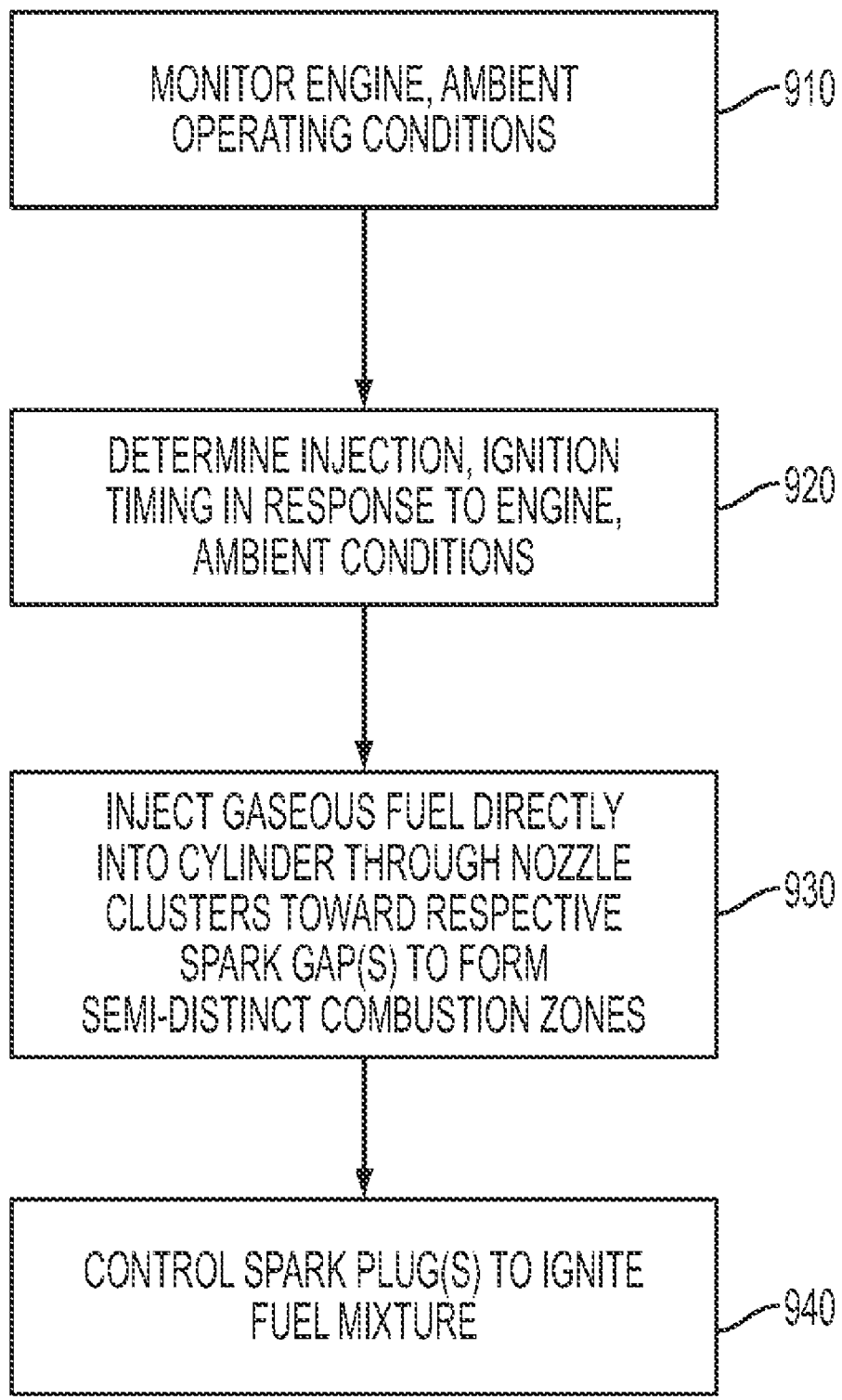
FIG. 9 illustrates operation of a system or method for controlling an engine capable of operating with gaseous fuel according to various embodiments of the present disclosure.

FIG. 9 illustrates operation of a system or method for controlling an engine capable of operating with gaseous fuel according to various embodiments of the present disclosure. Note that the control and estimation routines illustrated and described can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Block 910 of FIG. 9 represents monitoring of current engine (and/or vehicle) and ambient operation conditions. Operating conditions may include various temperatures, driver demand, engine and vehicle speed, load, etc. as determined by corresponding sensors or calculated or inferred by one or more controllers, such as controller 12. Injection and ignition timing is then determined in response to the current operating conditions as represented by block 920. Injection and ignition timing may be determined using corresponding calculations and/or look-up tables accessed by one or more operating parameters, such as engine speed and load, for example. Block 930 represents injecting gaseous fuel directly into each cylinder through a centrally located injector having a plurality of clusters of nozzles toward respective or corresponding spark gaps to form semi-distinct combustion zones as previously described. Controller 12 then generates a signal to initiate ignition as represented by block 940.

As illustrated and described with respect to FIGS. 1-9, various embodiments according to the present disclosure provide associated advantages, such as controlling fuel concentration and distribution to balance tradeoffs between emissions, heat transfer to the cylinder walls, and overall efficiency of the engine. Empirical evidence has demonstrated that the use of two spark plugs per cylinder in combination with an injector having corresponding nozzle clusters of three nozzles each to create multiple semi-distinct zones for combustion may increase brake thermal efficiency by up to 5% for a hydrogen fueled engine. However, strategies according to the present disclosure can be realized with a narrow range of design attributes. While embodiments using a single spark plug and dual multi-nozzle clusters each having three nozzles improve overall efficiency, use of dual spark plugs provides better combustion stability and facilitates more flexible injection timing, which contributes to additional efficiency gains. In addition, various embodiments exhibit an improved burn rate of 10-90% with burn time decreased by 10-15 crank angle degrees throughout the engine operating range.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments as previously described. Similarly, while the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. Any embodiments described as less desirable than other embodiments or prior art implementations with respect to one or more characteristics are not outside the scope of the disclosure and may be desirable for particular applications.

What is claimed is:

1. A method for controlling an engine capable of operating with gaseous fuel, comprising:
   injecting the gaseous fuel directly into each cylinder through a centrally located injector having a plurality of clusters of nozzles, each cluster associated with one of at least two spark plugs positioned closer to a cylinder wall than to the injector, each cluster directing the gaseous fuel toward an associated spark plug gap.

2. The method of claim 1 wherein each cluster of nozzles includes three nozzles.

3. The method of claim 1 wherein the gaseous fuel includes hydrogen, each cylinder includes two spark plugs, the plurality of clusters of nozzles includes two clusters, and the clusters of nozzles are separated by about 150 radial degrees.

4. The method of claim 1 wherein injecting comprises injecting gaseous hydrogen through the clusters of nozzles at an angle of between about 17 degrees and about 62 degrees relative to a top of the cylinder.

5. The method of claim 1 wherein injecting comprising injecting gaseous hydrogen through the clusters of nozzles at a radial angle of between about 5 and about 78 degrees for each cluster.

6. The method of claim 1 wherein the engine includes a cylinder head having an intake port and an exhaust port for each cylinder and wherein the spark plugs are positioned in the cylinder head between the intake and exhaust ports adjacent a cylinder wall.

7. The method of claim 1 wherein the engine includes a cylinder head having two intake valve openings and two exhaust valve openings for each cylinder and wherein the spark plugs and injector are positioned in the cylinder head along a cylinder common axis extending between the intake and exhaust valve openings.

8. The method of claim 1 wherein an entire operating range of the engine comprises injecting gaseous fuel to provide an end of injection only between about 15 degrees and about 85 degrees after top dead center (ATDC).

9. An engine having cylinders capable of combusting gaseous fuel, comprising:
   at least one spark plug per cylinder;
   a gaseous fuel injector extending into each cylinder and having at least one nozzle cluster containing a plurality of nozzles positioned to direct gaseous fuel only toward a spark gap of an associated spark plug; and
   a control system operating each spark plug and each injector to deliver gaseous fuel directly to the cylinder and initiate combustion.

10. The engine of claim 9 wherein the control system controls injection to inject gaseous hydrogen with an end of injection ranging between about 15-85 degrees after top dead center (ATDC).

11. The engine of claim 9 wherein the gaseous fuel comprises hydrogen, the at least one spark plug per cylinder includes two spark plugs per cylinder, and each cluster includes three nozzles.

12. The engine of claim 11 wherein a first cluster of nozzles is separated by about 150 radial degrees from a second cluster of nozzles.

13. The engine of claim 9 wherein each cluster includes three nozzles arranged to inject gaseous fuel within a radial range of between about 5 and 78 degrees.

14. The engine of claim 13 wherein each cluster includes three nozzles arranged to inject gaseous fuel within a range of between about 17 and 62 degrees relative to a cylinder roof.

15. The engine of claim 9 further comprising a cylinder head having two intake valve openings and two exhaust valve openings for each cylinder and wherein the at least one spark plug and the injector for each cylinder are positioned in the cylinder head along a cylinder comman axis extending between the intake and exhaust valve openings.

16. The engine of claim 9 wherein the gaseous fuel consists essentially of hydrogen and wherein the engine includes two spark plugs per cylinder and wherein each nozzle cluster injects gaseous hydrogen into a combustion zone corresponding to a spark plug gap of only one of the spark plugs.

17. The engine of claim 9 wherein each gaseous fuel injector is centrally mounted within a corresponding cylinder.

18. The engine of claim 17 wherein each spark plug is mounted adjacent a cylinder wall outboard of a valve axis passing through an intake valve and an exhaust valve central axis.

19. An engine capable of combusting gaseous fuel, comprising:
   an engine block having a plurality of cylinders;
   at least one cylinder head having a centrally located injector aperture, radially outboard spark plug apertures relative to the injector aperture, two intake valve openings, and two exhaust valve openings for each associated cylinder;
   a first and second spark plug associated with each cylinder and having associated first and second spark gaps, respectively;
   a gaseous fuel injector for each cylinder extending through an associated injector aperture into the cylinder, the injector including a first cluster of nozzles positioned to direct gaseous fuel to the first spark gap and a second cluster of nozzles positioned to direct gaseous fuel to the second spark gap; and
   a controller in communication with the injectors and the spark plugs that generates injection signals to inject gaseous fuel into respective cylinders and ignition timing signals to ignite the gaseous fuel.

20. The engine of claim 19 wherein the first and second cluster of nozzles each includes three nozzles, each cluster injecting fuel spanning a radial range of between about 5 and 78 degrees and an axial range of between about 17 and 62 degrees.

* * * * *